United States Patent [19]
Conner

[11] Patent Number: 5,850,784
[45] Date of Patent: Dec. 22, 1998

[54] KITCHEN CADDY WITH CUTTING BOARD

[76] Inventor: Jamie C. Conner, c/o Source Manufacturing Company, Inc., 191 Post Rd. West, Westport, Conn. 06880

[21] Appl. No.: 935,132

[22] Filed: Sep. 22, 1997

[51] Int. Cl.⁶ .............................. A47J 43/00; A47F 5/02; A47F 7/00; B23Q 3/00
[52] U.S. Cl. .......................... 99/485; 99/646 R; 211/70; 211/70.7; 248/37.3; 269/16; 269/289 R
[58] Field of Search .............................. 99/485, 484, 537, 99/467, 645, 646 R; 30/298.4; 206/763, 553, 561; 211/70, 70.7, 70.6, 163, 104, 88; 248/37.3, 37.6; 269/16, 13, 15, 289 R; D7/637, 638, 698, 641; 426/523

[56] References Cited

U.S. PATENT DOCUMENTS

| | | |
|---|---|---|
| D. 271,171 | 11/1983 | Kinkade . |
| D. 324,141 | 2/1992 | Wu . |
| D. 329,766 | 9/1992 | Ancona et al. . |
| D. 334,265 | 3/1993 | Giugiaro . |
| D. 380,940 | 7/1997 | Conner . |
| 1,861,683 | 6/1932 | Branch .................................... 451/552 |
| 2,333,715 | 11/1943 | Hahnemann ........................ 206/553 X |
| 3,727,501 | 4/1973 | Von Duyke ............................ 99/485 X |
| 3,848,943 | 11/1974 | Geesaman et al. ...................... 312/284 |
| 3,926,419 | 12/1975 | Kenny ........................................ 269/16 |
| 4,071,212 | 1/1978 | Burrows et al. ........................ 248/37.6 |
| 4,423,552 | 1/1984 | Bourgein et al. ..................... 30/296 A |
| 4,534,474 | 8/1985 | Ng ............................................ 311/70 |
| 4,936,470 | 6/1990 | Prindle ................................... 221/70.7 |
| 5,311,813 | 5/1994 | Fairbanks et al. .................... 99/646 R |
| 5,312,178 | 5/1994 | King .................................... 269/289 R |
| 5,361,915 | 11/1994 | Cohen et al. .......................... 211/70.7 |
| 5,363,755 | 11/1994 | Liang .................................... 99/646 R |
| 5,366,208 | 11/1994 | Benjamin ............................ 269/289 R |
| 5,606,908 | 3/1997 | Mittnight .................................. 99/485 |

Primary Examiner—Timothy F. Simone
Attorney, Agent, or Firm—Fattibene and Fattibene; Arthur T. Fattibene; Paul A. Fattibene

[57] ABSTRACT

A kitchen caddy that includes a main housing block formed of component parts in a manner to define a solid block having a series of grooves formed therein for stowing a variety of knives having blades of varying widths, and having connected to either side of the main housing block so formed a side housing section having slots formed therein for stowing the handle portions of various kitchen tools such as spoons, forks, spatulas and the like, in combination with a cutting board holder for stowing thereon a cutting board capable of having a width greater than that of the caddy knife block and connected tool holding side housing block.

10 Claims, 3 Drawing Sheets

KITCHEN CADDY WITH CUTTING BOARD

FIELD OF INVENTION

This invention is directed to a kitchen caddy and more specifically to a kitchen caddy having in combination therewith an arrangement for stowing a cutting board, as well as a variety of kitchen tools and knives.

BACKGROUND OF THE INVENTION

Numerous types of kitchen caddies for holding various types of kitchen tools and knives are known. Some of the known types of kitchen caddies are disclosed in U.S. Pat. Nos. 3,848,943; 4,423,552; 4,534,474; 4,936,470; and 5,361,915. Each of the foregoing disclose mutually distinct structures for achieving a caddy capable of receiving and stowing only kitchen tools and knives, each being uniquely different in structure and/or configuration.

Such known kitchen caddies heretofore did not include any facility for stowing a cutting board. As a result, such cutting boards were generally stored in a drawer and/or disposed at a distance removed from the caddy. Frequently, the inconvenience and/or lack of a conveniently available cutting board obligated the cook to use a counter top or table as his or her cutting board, and in all likelihood causing such counter top or table to be unduly scored or damaged.

A number of various designs for kitchen caddies are also known. Such known designs are disclosed in U.S. Design Pat. Nos. 271,171; 324,141; 329,766; 334,265 and 380,940.

In my prior patent application Ser. No. 08/654,574 filed May 29, 1996 and co-pending herewith, there is disclosed a kitchen caddy having a housing formed with a flat top surface configured with a central well for stowing various kitchen tools such as a mixing spoon, ladle, fork and the like, and having spaced slots for the stowing of various types of kitchen knives and a limited sized cutting board due to the configuration of the housing.

SUMMARY OF THE INVENTION

An object of this invention is to provide a kitchen caddy in the form of a block which can be readily manufactured in a simple and expedient manner.

Another object of this invention is to provide a kitchen caddy in the form of a main block having opposed similar blocks attached to either side of the main block for stowing various kitchen tools and knives and including a flanged ledge connected thereto to facilitate the stowing of a relatively large sized cutting board.

Another object is to provide a kitchen caddy constructed to provide stowage of a cutting board whereby the various kitchen tools, knives, and cutting board are rendered relatively accessible to the cook.

The foregoing objects and other features and advantages are attained by a kitchen caddy that includes a block formed of component parts that are suitably secured together to form a solid housing having a series of longitudinally extending grooves or slots, each such groove or slot being sized to receive a particular, corresponding sized knife blade.

A pair of similarly constructed side blocks are connected to either side of the main block so as to define a solid side housing having a series of grooves or slots for receiving the handles of various kitchen tools such as serving spoons, forks, spatulas and the like. Connected to the rear surface of the main housing and associated side housings is a flanged ledge for receiving and stowing a cutting board thereon, the entire housing being rotatably supported upon a base carousel which is adapted to rest upon a suitable supporting surface such as a kitchen counter or table.

IN THE DRAWINGS

DETAILED DESCRIPTION

Figure 1:
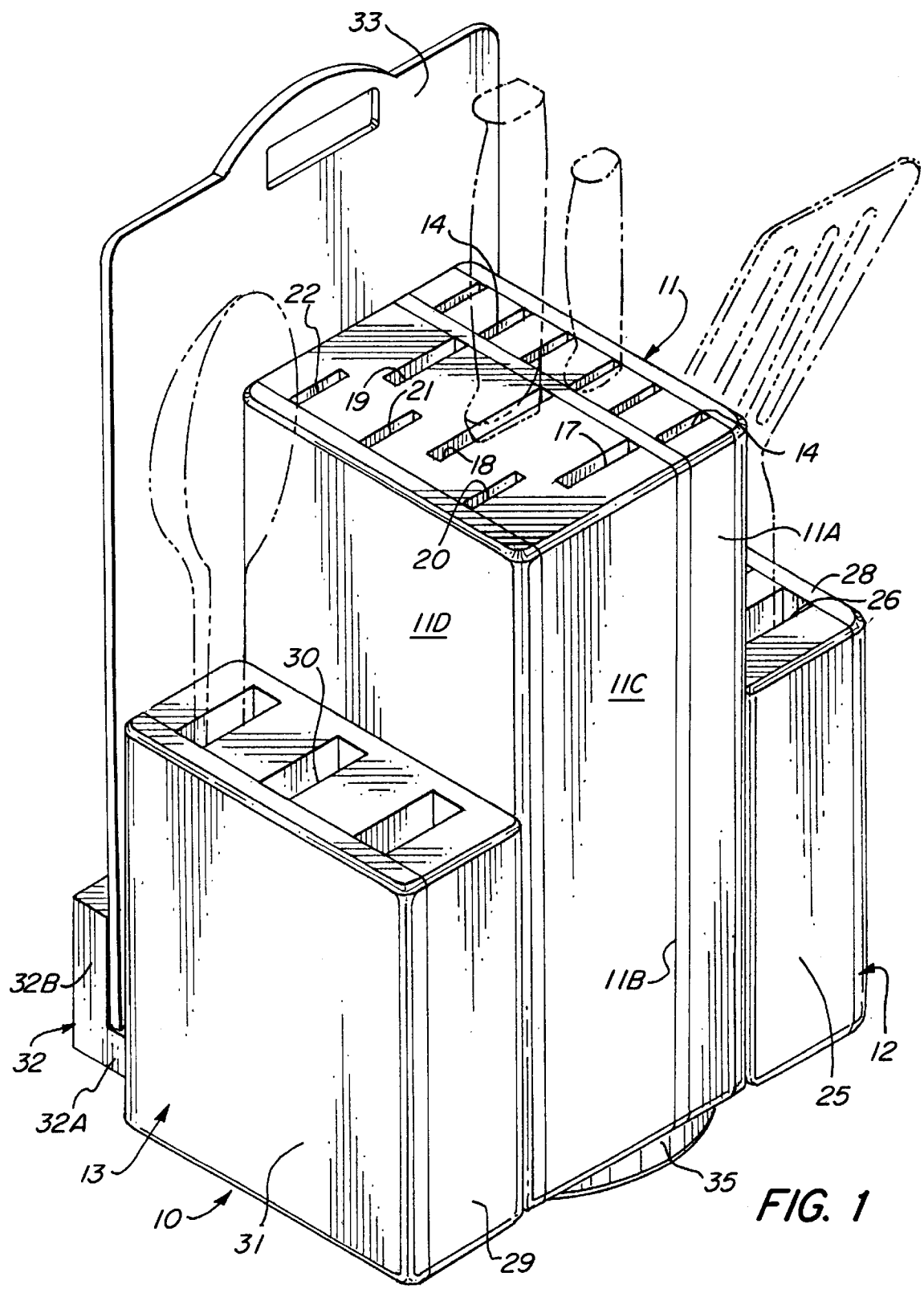
FIG. 1 is a perspective view of a kitchen caddy embodying the invention.
Figure 2:
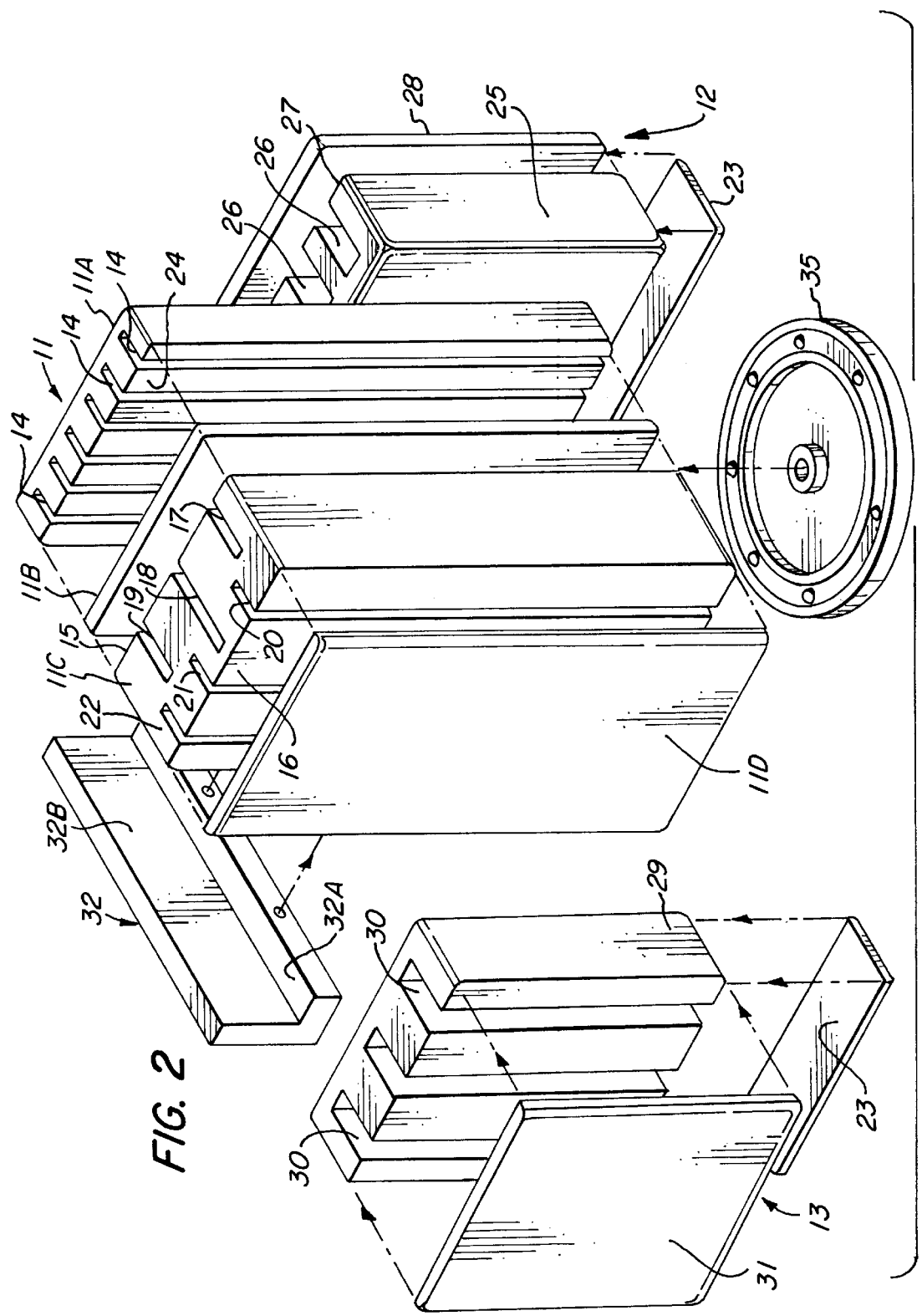
FIG. 2 is an exploded perspective view illustrating the component parts of the kitchen caddy of FIG. 1.

Referring to FIGS. 1 and 2, there is illustrated a kitchen caddy embodying the invention. As shown, the kitchen caddy 10 includes a main housing section 11 and a pair of side housing sections 12 and 13 that are connected to opposite sides of the main housing section 11. As shown, the height of the respective side housing sections 12 and 13 is approximately half that of the main housing section 11. However, it will be understood that the relative height ratio of the respective housing sections 11, 12 and 13 can vary. In the assembled form as seen in FIG. 1, the respective housing sections are constructed to define a solid block having formed therein a series of slots or grooves to define an elongated recess for receiving the knife blades and/or kitchen tools adapted to be stowed therein.

The main housing section 11, as best seen in FIG. 2, comprises a relatively thick end wall 11A, an intermediate panel 11B, a relatively thick intermediate block 11C and a relatively thin end panel 11D. As shown, the relatively thick end wall 11A is provided with a series of parallel disposed slots 14 that extend co-extensively along the length of end wall 11A. Preferably, the caddy may be formed of wood, in which case the slots 14 can be formed in the end wall 11A by a gang saw cut. In the illustrated embodiment, six gang sawed slots 14 are formed. However, it will be understood that the number of gang saw cuts can be varied. The slots 14 are illustrated as being generally uniform in depth so as to accommodate the width of a designated knife blade, e.g. a steak knife.

The thick intermediate block 11C is formed with opposed parallel faces 15 and 16. A series of knife blade slots 17, 18 and 19 are formed in face 15, and a series of knife blade slots 20, 21 and 22 are formed in face 16 of the intermediate block 11C. The arrangement is such that slots 17, 18 and 19 in face 15 are staggered or off-set relative to slots 20, 21, and 22 in face 16. This arrangement permits knife blades of varying widths to be stowed in the corresponding slots 17, 18, 19 and 20, 21, 22.

The main housing section is assembled by securing the intermediate panel 11B to the face 24 of the end wall 11A. Face 15 of the intermediate thick block is secured to intermediate panel 11B; and end panel 16 is secured to face 15 of the intermediate block to define a solid main housing 11 having the respective knife blade slots 14, 17, 18, 19 and 20, 21, 22 formed therein. Preferably, the securing of the main housing components can be accomplished with suitable adhesives or glue.

In the arrangement described, the knife blade slots 17, 18, 19 and 20, 21, 22 formed in the intermediate block 11C can be formed simultaneously by a gang saw cut. Preferably, the components 11A–11D are formed of wood. However, the same may be formed of other suitable materials capable of being sawed, cut or machined as herein set forth.

As best seen in FIGS. 1 and 2, a side housing section 12 and 13 is connected to the opposite sides of the main housing section 11. The side housing section 12 includes a relatively thick block portion 25 which has formed therein a series of slots or grooves 26. As hereinbefore described, the grooves 26 are gang cut or sawed. Connected to face 27 of the block 25 is an end panel 28; and a bottom panel 29 in connected to the lower end of block 25 to close the lower end of slots 26. The other side housing section 13 is similarly constructed.

As seen in FIG. 2, side housing section 13 includes a block 29 formed with slots 30 and to which a side panel 31 is secured, preferably by gluing or bonding with a suitable adhesive. A bottom panel 32 is secured to the bottom of block 29 to form a closure at the end of slots 30.

As shown in FIG. 1, the slots 26 and 30 in the respective side housing sections 12 and 13 are arranged to receive the handle of such cooking tools as serving spoons, spatulas and the like. As illustrated, the side housing sections 12 and 13 are sized so as to be shorter than the main housing section 11. Preferably, the side housing sections 12 and 13 are adhesively secured to the main housing section.

As a cutting board constitutes an important kitchen aid, a feature of this invention resides in providing a means whereby a cutting board is readily stowed on the caddy 10 so as to be readily accessible, as are the knives and tools stowed in the caddy 10. This is attained by attaching a cutting board holder 32 to the rear of the caddy 10. The cutting board holder comprises a flanged member having one leg 32A defining a horizontal ledge which is suitably secured to the rear of the caddy 10. The other leg 32B of the cutting board holder 32 is vertically disposed in spaced relationship to the rear of the caddy 10. The cutting board holder 32 thus defines a support upon which a cutting board 33 is vertically supported at the rear of the caddy 10. As the cutting board holder 32 is defined by a flanged member defining a ledge which is open ended, it will be apparent that the width and length of the cutting board 33 may be unlimited, i.e. that various size cutting boards can be stowed on the caddy 10. This is important, as the size of the cutting board is not limited by the size of the caddy block or housing.

With the construction thus far described, it will be apparent that a cutting board 33 is at all times conveniently accessible and stowed together with the knives to be used therewith. The construction further permits a relatively large sized cutting board 33 to be stowed on the kitchen caddy 10, as the structure of the housing sections 10, 11 and 12 do not obstruct or limit the size of a cutting board 33 adapted to be stowed thereon.

Figure 3:
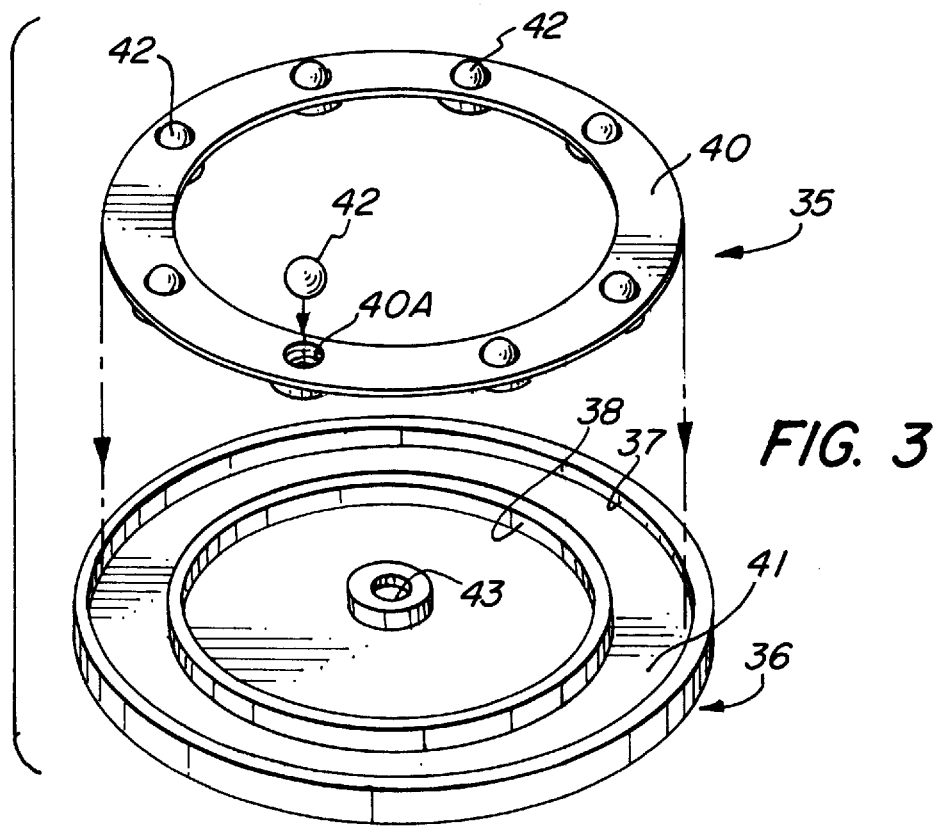
FIG. 3 is an exploded perspective view of the carousel detail.
Figure 4:
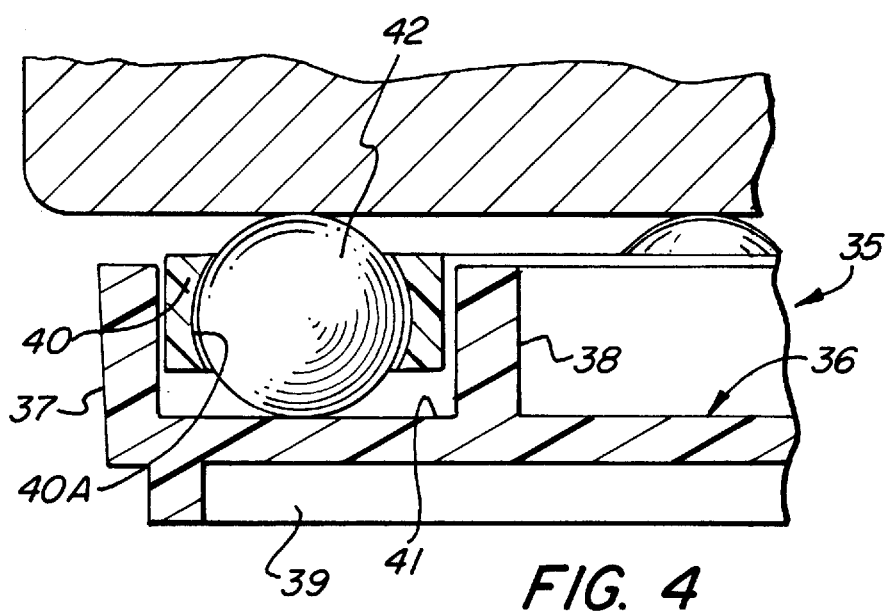
FIG. 4 is a fragmentary sectional view of the assembled carousel of FIG. 3.

The kitchen caddy 10 described is further rotatably mounted on a carousel 35 so that it can be readily rotated. As shown in FIGS. 2, 3 and 4, the carousel 35 includes a base member 36 of a circular configuration having spaced apart circumscribing upright flanges or walls 37, 38 to define a circular bearing channel 41 and a depending circumscribing flange 39 that supports the carousel on a supporting surface such as a table or counter top. A bearing ring 40 having a plurality of ball bearing seats 40A, circumferentially spaced therearound, is disposed within the bearing channel 41. A ball bearing 42 is rotatably journalled in each ball bearing seat 40A. The base member 36 is provided with a central aperture or hole 43 for receiving a screw fastener by which the carousel 35 is secured to the bottom of the main housing 11C.

From the foregoing, it will be apparent that the described caddy 10 is provided with means for stowing the kitchen tools and knives most frequently used in a kitchen, together with a good sized cutting board, and is mounted for rotation to provide ready access to a desired tool or knife, as well as to the cutting board. The caddy includes a solid housing that is provided with slots for stowing knives and kitchen tools formed so that it can be readily manufactured in a simple and expedient manner. The arrangement is such that the slots or grooves can be readily gang cut or sawed in the respective component parts as herein described.

While the present invention has been described with respect to a particular embodiment, modifications and variations may be made without departing from the spirit or scope of this invention.

What is claimed is:

1. A kitchen caddy comprising:

a solid main housing section, a pair of opposed solid side housing sections connected to the opposed sides of said main housing section, each of said main and side housing sections including a plurality of spaced slots formed therein, said slots extending longitudinally through said respective housing sections, said slots in said main housing section being of various widths so as to accommodate knife blades of corresponding varying widths, and said slots formed in said side housing sections having a width sized for accommodating the handle of various kitchen tools, a flanged ledge connected to the rear of said connected housing sections, said flanged ledge including an upwardly extending flange spaced from the rear of said connected housing sections, and a cutting board stowed on said flanged ledge.

2. A kitchen caddy as defined in claim 1 and including a carousel forming a base support for said caddy.

3. A kitchen caddy as defined in claim 1 wherein said main housing section includes a relatively thick end wall, said end wall having a plurality of spaced apart longitudinally extending grooves formed therein, an intermediate panel corresponding in length and width to said end wall connected to said end wall to define a closure for the open end of said grooves, an intermediate block having a thickness greater than the thickness of said end wall, said intermediate block having slots formed in the opposed side surfaces of said intermediate block of varying depth, said slots formed in the opposed surfaces of said intermediate block being offset to one another, said intermediate block having one of said slotted surface connected in surface to surface contact with said intermediate panel, and an end panel connected to the other slotted surface of said intermediate block to form a solid main housing section having a plurality of grooves and slots extended therethrough, and said slots and grooves being adapted to receive and stow therein knives having blades corresponding to the sizes of said slots and grooves.

4. A kitchen caddy as defined in claim 1 wherein each of said side housing sections comprises:

a relatively thick end block, a plurality of longitudinally spaced apart slots formed therein, a side panel connected to said end block defining a closure for the open end of said slots, and a bottom wall connected to the lower end of said side housing section for closing the lower end of said slots, and each of said side housing sections having a height which is less than that of said main housing section wherein said slots are adapted to receive and stow a handle portion of various kitchen tools.

5. A kitchen caddy as defined in claim 3 and including opposed solid side housing sections, each of said solid side housing sections having a plurality of slots formed therein adapted to receive and stow therein a handle portion of a kitchen tool, and each of said solid side housing sections having a height which is less than that of said main housing section.

6. A kitchen caddy comprising:

a solid block forming a central main housing having a series of slots of variable widths extending longitudinally therethrough, each of said slots being adapted to receive and stow therein a knife blade having a width corresponding to the width of said slots, a solid side housing block connected to either side of said main housing block, each of said side housing blocks having a plurality of through slots formed therein, a bottom wall connected to each of said side housing blocks to close the lower end of said slots extending through said side housing blocks, said through slots being adapted to receive and stow a handle portion of a kitchen tool, and a cutting board holder connected to said main housing block and connected side block, said cutting board holder being adapted to receive a cutting board in stowed position thereon.

7. A kitchen caddy as defined in claim 6 and including a carousel for rotatably supporting said main housing and connected side housing block thereon.

8. A kitchen caddy as defined in claim 6 wherein said cutting board holder comprises a ledge connected to said main housing, an upwardly extending flange connected to said ledge, said flange being spaced from said main housing block and connected side housing blocks, and a cutting board stowed on said ledge between said flange and said main housing block.

9. A kitchen caddy comprising:

a solid main housing section, said main housing section including a relatively thick end wall, said end wall having a series of spaced apart grooves having an open side extending therethrough, an intermediate panel connected to said end wall to define a closure for the open side of said grooves, a relatively thick intermediate block, said intermediate block having a series of grooves formed in opposite sides thereof, said intermediate block grooves being of variable widths for accommodating variable knife blades of corresponding widths, said intermediate block having one side connected to said intermediate panel, and an end panel connected to the other side of said intermediate block, a side housing connected to the opposite sides of said main housing block, each of said side housings including a relatively thick block having a series of spaced apart open end slots extending therethrough, a side panel connected to said side housing block to close the open end of said slots, a bottom wall connected to each of said side housing blocks, said side housing slots having a width sized for receiving and stowing therein a handle portion of a kitchen tool, a cutting board holder connected to said main housing and connected side housing blocks, said holder including a ledge connected to said main housing and connected side housing blocks, an upwardly extending flange connected to said ledge, said flange being spaced from said main housing section, a carousel connected to said main housing section for rotatably supporting said housing section thereon, and a cutting board stowed on said ledge between said flange and said main housing section and connected side housing.

10. A kitchen caddy as defined in claim 9 and including a carousel for rotatably supporting said main housing section and connected side housing, said carousel including a base member, said base member having a pair of spaced apart upwardly extending circumscribing flanges to define a bearing channel, a bearing retaining ring disposed in said bearing channel, said bearing retaining ring having a plurality of circumferentially spaced bearing seats, and a ball bearing disposed in each of said bearing seats, and a fastener securing said base member to said housing section whereby said ball bearings are disposed in bearing relationship to said housing section.

* * * * *